(12) United States Patent
Scott et al.

(10) Patent No.: US 7,972,573 B2
(45) Date of Patent: Jul. 5, 2011

(54) SUPERCRITICAL WATER OXIDATION APPARATUS AND PROCESS

(75) Inventors: John Scott, Arcadia, CA (US); James Osterloh, West Richland, WA (US)

(73) Assignee: Parsons Corporation, Pasadena, CA (US)

( * ) Notice: Subject to any disclaimer, the term of this patent is extended or adjusted under 35 U.S.C. 154(b) by 0 days.

(21) Appl. No.: 12/728,795

(22) Filed: Mar. 22, 2010

(65) Prior Publication Data

US 2010/0176040 A1 Jul. 15, 2010

Related U.S. Application Data

(62) Division of application No. 11/749,605, filed on May 16, 2007, now Pat. No. 7,682,514.

(51) Int. Cl.
*B01J 3/00* (2006.01)
*B01J 19/02* (2006.01)
*C02F 1/72* (2006.01)

(52) U.S. Cl. ......... 422/242; 422/129; 422/198; 422/208

(58) Field of Classification Search .................. 210/761; 422/117, 118
See application file for complete search history.

(56) References Cited

U.S. PATENT DOCUMENTS

| | | | |
|---|---|---|---|
| 3,262,759 A | 7/1966 | Pomot et al. | |
| 4,413,646 A * | 11/1983 | Platt et al. ...................... | 137/240 |
| 6,054,057 A | 4/2000 | Hazlebeck et al. | |
| 7,122,167 B2 | 10/2006 | Collard et al. | |
| 7,682,514 B2 | 3/2010 | Scott et al. | |
| 2003/0185733 A1* | 10/2003 | Collard et al. .................. | 423/22 |
| 2006/0088460 A1* | 4/2006 | Garcia-Ortiz et al. ........ | 423/219 |

* cited by examiner

*Primary Examiner* — Duane Smith
*Assistant Examiner* — Paul J Durand
(74) *Attorney, Agent, or Firm* — Denton L. Anderson; Sheldon Mak & Anderson PC

(57) ABSTRACT

A reactor suitable for the continuous oxidizing of an organic material in a supercritical water oxidation process, the reactor includes (a) a reactor body with reactor walls; (b) and a threaded reactor upper plug; and (c) a cylindrical liner attached solely to the threaded reactor upper plug, such that, when the threaded reactor upper plug is removed from the reactor, the reactor liner is consequently and simultaneously removed from the reactor as well.

11 Claims, 7 Drawing Sheets

SUPERCRITICAL WATER OXIDATION APPARATUS AND PROCESS

RELATED APPLICATIONS

This application is a divisional application of U.S. patent application Ser. No. 11/749,605, filed Nov. 28, 2006 (which will issue as U.S. Pat. No. 7,682,514 on Mar. 23, 2010), entitled SUPERCRITICAL WATER OXIDATION APPARATUS AND PROCESS, the entirety of which is incorporated herein by reference.

FIELD OF THE INVENTION

This invention relates generally to processes and equipment for processing organic contaminants and, more specifically, to processes and equipment for destroying organic contaminants using supercritical water oxidation methods.

BACKGROUND OF THE INVENTION

Supercritical water oxidation (SCWO) processes can be used to destroy liquid or slurry organic waste streams, especially low volume organic waste streams. SCWO processes take advantage of the unique properties of water at conditions near and beyond the thermodynamic critical point of water (705° F. and 3206 psia). Above the critical point, water has the characteristics of a very dense gas. Organic materials and gases are miscible in this dense water vapor. Thus, above the critical point, liquid or slurry organic waste streams can be readily oxidized and destroyed with very high efficiency.

SCWO processes are well-known in the art. For example, U.S. Pat. Nos. 2,944,396, 4,543,190, 5,387,398, 5,405,533, 5,501,799, 5,560,822, 5,804,066, 6,054,057, 6,056,883, 6,238,568, 6,519,926, 6,576,185, 6,709,602 and 6,773,581, the entireties of which are incorporated herein by this reference, describe various forms of SCWO processes.

In a typical SCWO process, a feed stream containing water and an organic waste material is pressurized, mixed with an oxidizer and caused to react in a plug flow reactor. Thermal energy produced by the oxidation reactions provides the necessary preheat for the reactants. If the feed streams have an inadequate heating value, supplemental fuel is added or the feed streams are preheated. The reactor is designed to provide the required residence time (typically less than about one minute) at supercritical conditions.

Unfortunately, SCWO processes of the prior art are unduly expensive to operate and maintain. For example, depending upon the feed stream, a consumable reactor liner may be required to protect the interior reactor walls from the highly corrosive combustion process and the resulting reaction products. Such a liner may need to be replaced as frequently as every 60-70 hours of operation, resulting in considerable maintenance and operating costs associated with the resulting down time. Other significant costs associated with prior art SCWO processes are the capital costs and operating costs required in providing compressed oxygen or compressed air at 3500-4000 psig. Typically, the operating costs involved in operating air compressors for a SCWO reactor account for greater than 90% of the total operating cost.

Another cost associated with prior art SCWO processes is the large amount of aqueous reaction products produced in the process. Typically such aqueous reaction products present an expensive problem to the operator of the process. Moreover, reaction product salts tend to precipitate out in down stream equipment resulting in the fouling of such equipment, requiring frequent and expensive maintenance to remove such salts.

Accordingly, there is a need for a SCWO process which avoids or minimizes the aforementioned problems in the prior art.

SUMMARY

The invention satisfies this need. The invention is a method of oxidizing an organic material comprising the steps of (a) forming a preoxidation mixture comprising the organic material and water, and (b) causing the preoxidation mixture to react with a liquid oxidizer in a continuous flow reactor supercritical conditions for water, including a pressure of at least 3206 psia and a temperature of at least 705° F., to form a post-oxidation mixture containing condensible material and non-condensible material, wherein substantially all of the organic material has been oxidized.

In one embodiment of the invention, the liquid oxidizer is hydrogen peroxide solution, typically a 50 weight percent hydrogen peroxide solution.

In another aspect of the invention, the invention is a reactor useful in the continuous oxidation of organic materials in an SCWO process. The reactor comprises a reactor body with reactor walls and a threaded reactor upper plug. The reactor also comprises a cylindrical liner attached solely to the threaded reactor upper plug, such that, when the threaded reactor upper plug is removed from the reactor, the reactor liner is consequently and simultaneously removed from the reactor as well.

In yet another aspect of the invention, the invention is a reactor useful in the continuous oxidation of organic materials in an SCWO process, wherein the reactor comprises an internal letdown valve. In a typical embodiment of this aspect of the invention, the internal letdown valve comprises a heat shield, a needle seat and a piston actuated needle. In another embodiment of the internal letdown valve, the letdown valve comprises a heat shield, a needle seat and a bellows operated needle. In either case, the vertical needle position is modulated by a pressure feedback loop to control vessel pressure. During operation, there is sufficient clearance between the needle and the needle seat to allow salt precipitated in the vessel to be swept through the internal letdown valve for collection later in the process stream.

DRAWINGS

These and other features, aspects and advantages of the present invention will become better understood with reference to the following description, appended claims and accompanying drawings where:

DETAILED DESCRIPTION

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a method of oxidizing an organic material comprising the steps of (a) forming a preoxidation mixture comprising the organic material and water, and (b) causing the preoxidation mixture to react with a liquid oxidizer in a continuous flow reactor supercritical conditions for water, including a pressure of at least 3206 psia and a temperature of at least 705° F., to form a post-oxidation mixture containing condensible material and non-condensible material, wherein substantially all of the organic material has been oxidized.

In the invention, the liquid oxidizer is typically hydrogen peroxide, most typically hydrogen peroxide in a 50 weight percent solution.

Figure 1:
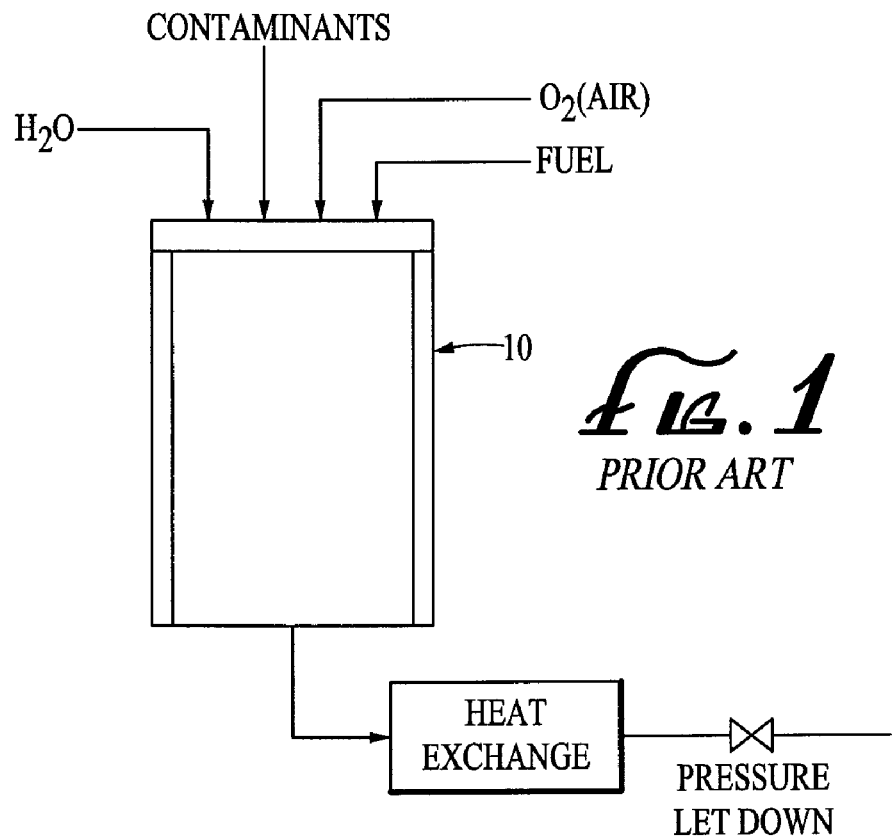
FIG. 1 is a flow diagram illustrating a SCWO process of the prior art.
Figure 2:
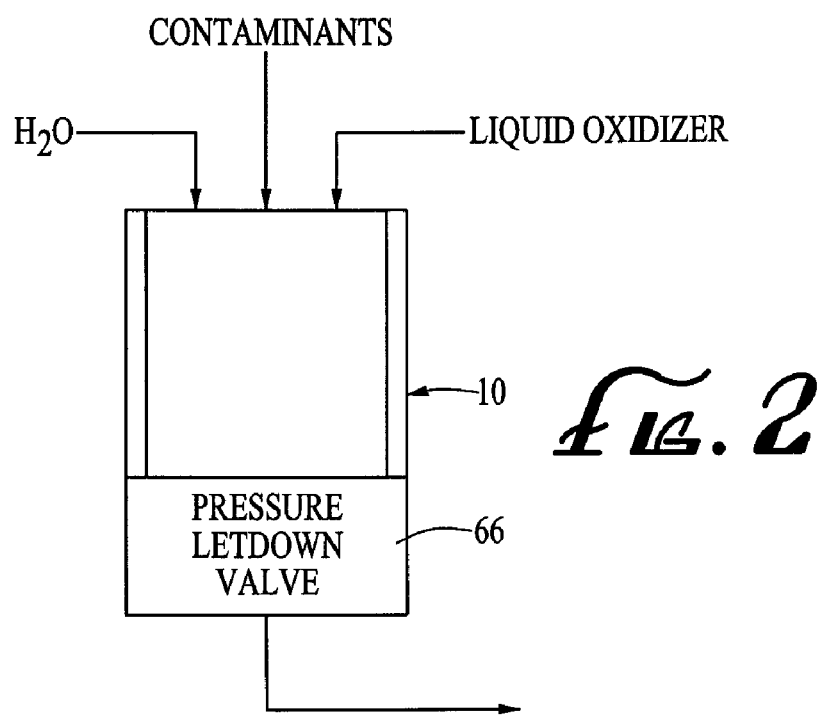
FIG. 2 is a process flow diagram illustrating a SCWO process having features of the invention.

The invention differs from most SCWO oxidizing methods of the prior art wherein the oxidizer is either pure oxygen or air. Accordingly, the invention as illustrated in the flow diagrams set forth in FIG. 2 is contrasted with most prior art SCWO oxidizing methods using gaseous oxygen as illustrated in FIG. 1.

The use of a liquid oxidizer eliminates the need for a high pressure compressed air system. This results in a substantial space and cost savings. Eliminating the high pressure compressed air system also eliminates the operating hazards associated with such a system. Instead of having to use an air compressor with a massive 300 horsepower motor, hydrogen peroxide can be supplied to the reactor by a simple 7.5 horsepower pump.

Figure 3:
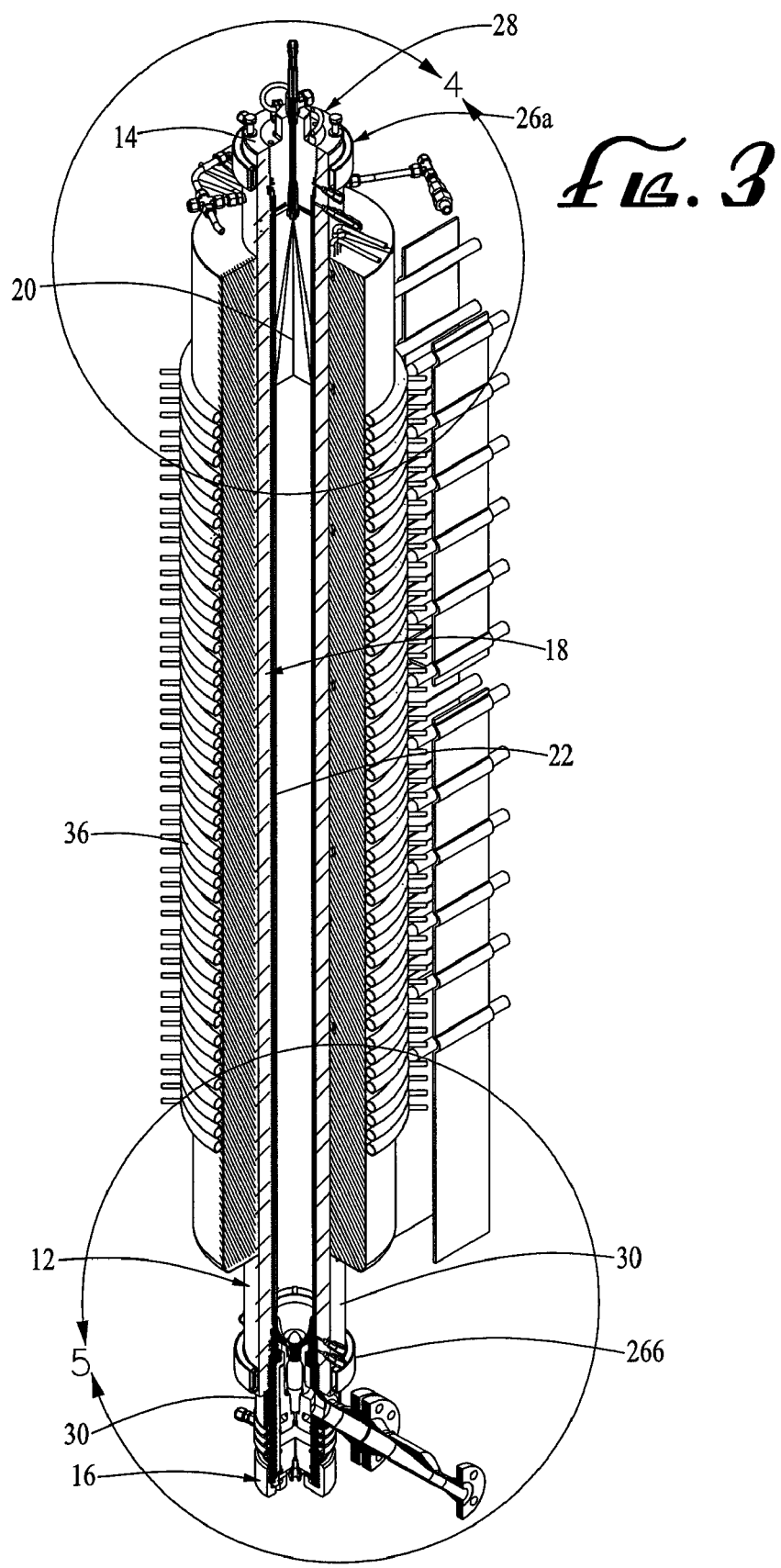
FIG. 3 is a perspective drawing, in partial cutaway, of a SCWO reactor having features of the invention.

The invention can be practiced in the reactor 10 illustrated in FIG. 3. The reactor 10 comprises a cylindrical reactor body 12 which is capped at the top by an upper plug 14 and is capped at the bottom by a valve housing 16.

The reactor body 12 is typically made from corrosive resistant materials such as 316 stainless steel or high nickel stainless steels. The thickness of the reactor body walls 18 is designed to safely contain the temperatures and pressures present during operation.

Within the reactor body 12, between the upper plug 14 and the valve housing 16, is defined an oxidation zone 20 wherein the oxidation reactions take place during operation. Typical operating conditions within the oxidation zone 20 include pressures of about 3500 psig and temperatures of about 1200° F.

A protective liner 22 is disposed within the oxidation zone 20, proximate to the interior surfaces of the reactor body walls 18 to protect the reactor body walls 18 from chemical degradation caused by corrosive conditions generated during the oxidation process.

The liner 22 is typically made from a chemical resistant material, such as nickel-molybdenum-chromium-tungsten alloy (such as Hastelloy™, UNS N 10276), ceramics, or platinum. In a typical operation, when the liner is made from a nickel-molybdenum-chromium-tungsten alloy, it is between about 0.125 inches and about 0.750 inches in thickness.

The disposition of the liner 22 within the oxidation zone 20 defines a narrow annulus 24 between the walls 18 of the reactor body 12 and the liner 22. The annulus 24 is purged with a small but constant flow of flushing water to chemically protect the reactor body walls 18. The flow rate of flushing water is typically less than about 1 gallon per minute.

Cooling water jackets 26a and 26b, respectively, are provided surrounding the upper end 28 of the reactor body 12 and around the lower end 30 of the reactor body 12 to provide cooling to those areas of the reactor 10 during operation.

Cooling water piping 32 is provided about the exterior of the reactor 10 to provide cooling water to strategically located injection ports 34 along the reactor 10.

Induction heating coils 36 are disposed around the reactor 10 to provide heating to the oxidation zone 20 during operation. The induction heating coils 36 are used to bring the oxidation zone 20 to normal operating conditions during startup and to add the energy necessary to maintain the required oxidation zone 20 operating conditions when processing feed streams which do not contain an adequate amount of energy to maintain a self-sufficient reaction. Accordingly, use of induction heating coils 36 allows the destruction of low BTU value waste streams without requiring the use of supplemental fuels.

The use of induction heating coils 36 thus permits process heat up without the necessity for large quantities of supplemental fuels and without the generation of large quantities of heat up liquid. Also, in prior art SCWO designs, the use of supplemental fuels necessarily requires considerable volumes of process water. Still further, in prior art SCWO designs, dilution water is used to transport salts as the reaction products exit the reactor 10. By contrast, no dilution water is required in the present invention. Salts exit the reactor 10 in a non-fouling gas solid suspension (since the steam is only condensed after its exit from the reactor 10).

Figure 4:
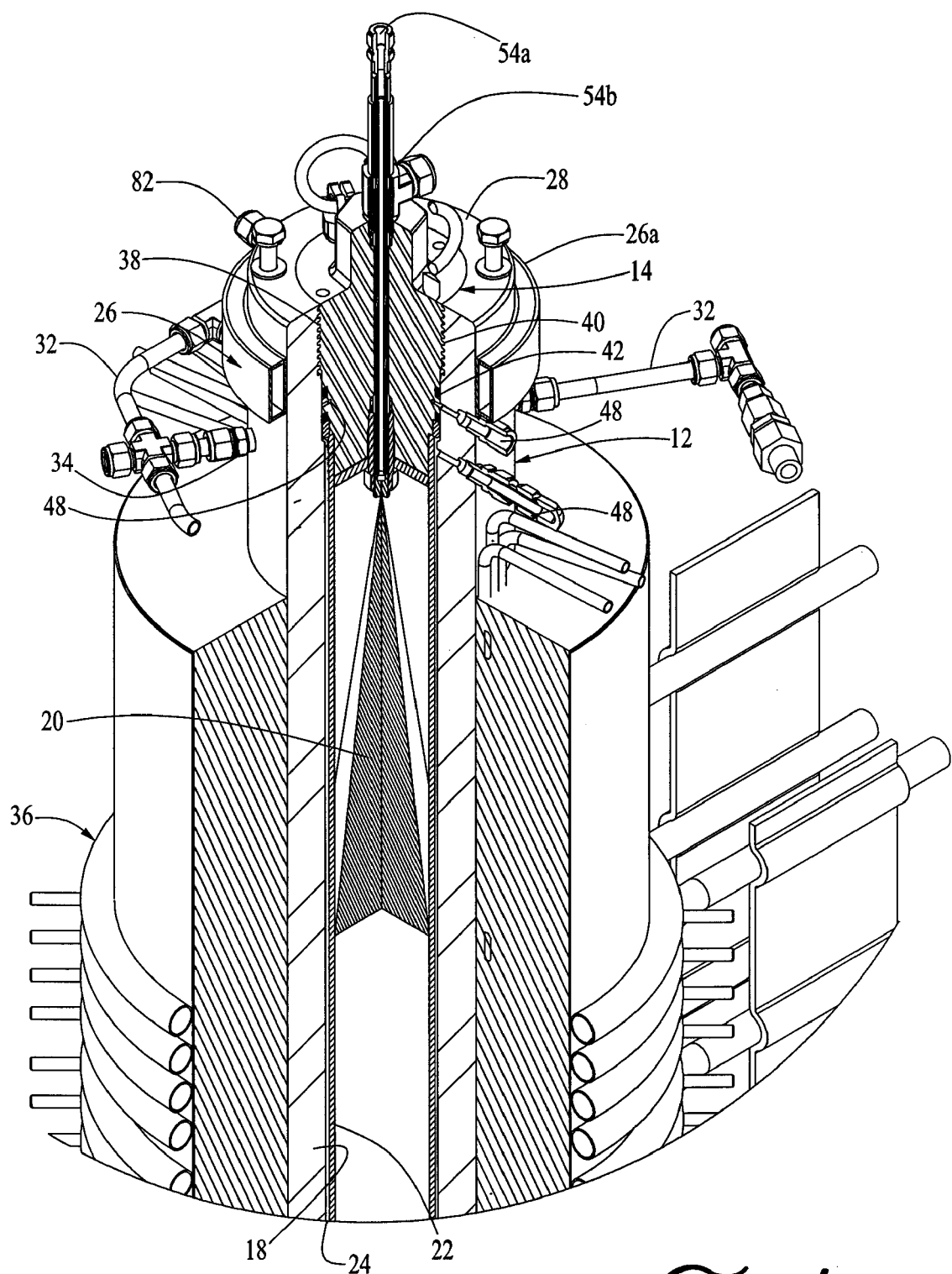
FIG. 4 is a detailed perspective drawing, in partial cutaway, of the upper portion of the reactor illustrated in FIG. 3.
Figure 5:
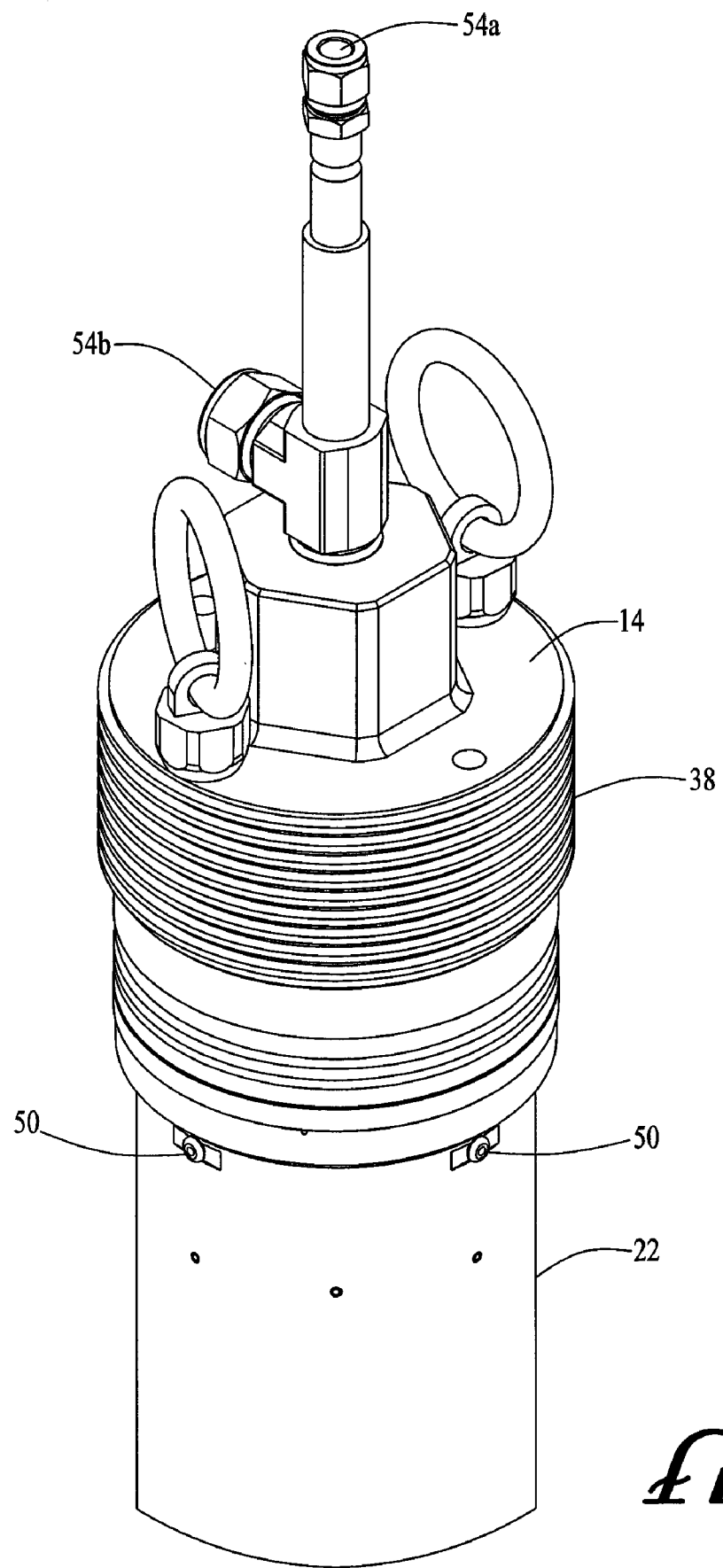
FIG. 5 is a perspective view of a threaded plug and liner portion of the reactor illustrated in FIG. 3.

The upper plug 14 is illustrated in detail in FIGS. 4 and 5. The upper plug 14 is provided with exterior threads 38 which are sized and dimensioned to cooperate with interior threads 40 defined in the reactor body walls 18 of the upper end 28 of the reactor body 12. Both sets of threads 38 and 40 are preferably ACME threads to positively seat seal rings 42.

The seal rings 42 are provided around the upper plug 14 to provide sealing between the upper plug 14 and the reactor body 12. Cooling water is injected between the seal rings 42 via injection nozzles 48.

Figure 8:
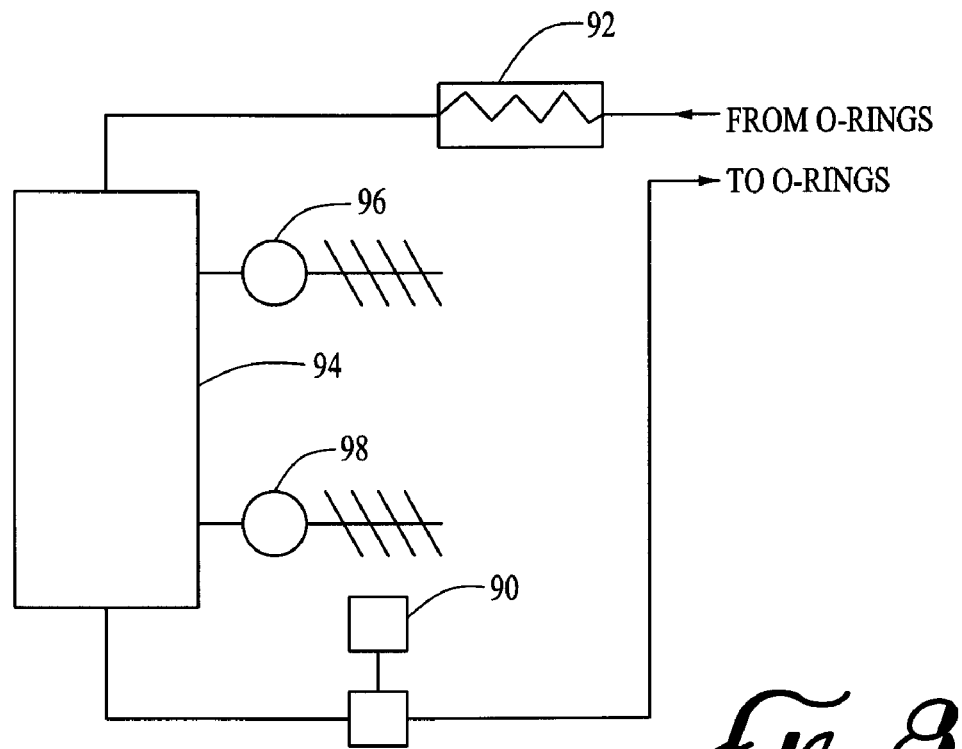
FIG. 8 is a flow diagram illustrating an O-ring cooling system useful in the invention.

Independent cooling systems, such as those illustrated in FIG. 8, are preferably provided for each pair of seal rings 42. Each independent cooling system is comprised of a circulation pump 90, a heat exchanger 92, a surge tank 94, a high level alarm 96 and a low level alarm 98. Should a seal ring 42 seal failure occur, the leakage past a primary seal ring 42 will cause its surge tank 94 level to rise, thereby activating its high-level alarm 96. In the event of a backup seal ring 42 failure, the surge tank 94 level would drop due to coolant leakage, thereby activating the low-level alarm 98.

The use of a threaded upper plug 14 also provides for simplified upper plug fabrication. Prior art SCWO system designs require the use of a forged, flanged head, whereas, in the invention, the upper plug 14 can be fabricated from readily available, high-quality pressure vessel materials. The threaded upper plug 14 eliminates the need for forging prior to machining, and thus reduces fabrication time. The threaded upper plug 14 also reduces the time necessary to replace the liner 22.

As illustrated in FIG. 5, the liner 22 is attached to the upper plug 14 by press fit retainer pins 50. Using this design, the upper plug 14 and the liner 22 are a single, integral assembly.

Accordingly, the removal during maintenance of the upper plug 14 consequently and simultaneously removes the liner 22 at the same time.

In one embodiment of this design, to separate the liner 22 from the upper plug 14, the press fit retainer pins 50 are driven inwardly, into an annulus (not shown) within the upper plug 14. The annulus is sufficiently large to allow the retainer pins 50 to be fully removed from the liner 22 and upper plug 14 by driving them further inward.

In another embodiment of this design, the press fit retainer pins 50 are machined with heads on them which limit inward travel, thereby precluding the possibility of the pins inadvertently loosening. In this embodiment, the liner 22 is separated from the upper plug 14 by grasping the heads on the press fit retainer pins 50 and pulling them outward.

Prior art SCWO designs utilizing a forged, flanged head retain the flanged head in place with torqued bolts to form the upper boundary of the oxidation zone 20. With the threaded upper plug 14 of the invention, no torquing is required. Thus, the threaded upper plug 14 of the invention is much quicker and easier to install and remove.

Also, during routine liner 22 change outs, a spare threaded upper plug 14 with a new liner 22 attached can be staged before removing the old assembly. Removing the old assembly and installing the newly staged assembly thus further reduces maintenance downtime.

In one embodiment of the invention, feed stream ports 54a and 54b are provided at the top of the upper plug 14 for inputting hydrogen peroxide and for inputting a combined water and organic waste preoxidation feed stream mixture, respectively. Separate passageways are defined within the upper plug 14 to carry the preoxidation feed stream mixture and the hydrogen peroxide feed stream to the bottom portion of the upper plug 14, whereupon both feed streams are injected into the oxidation zone 20.

Figure 6:
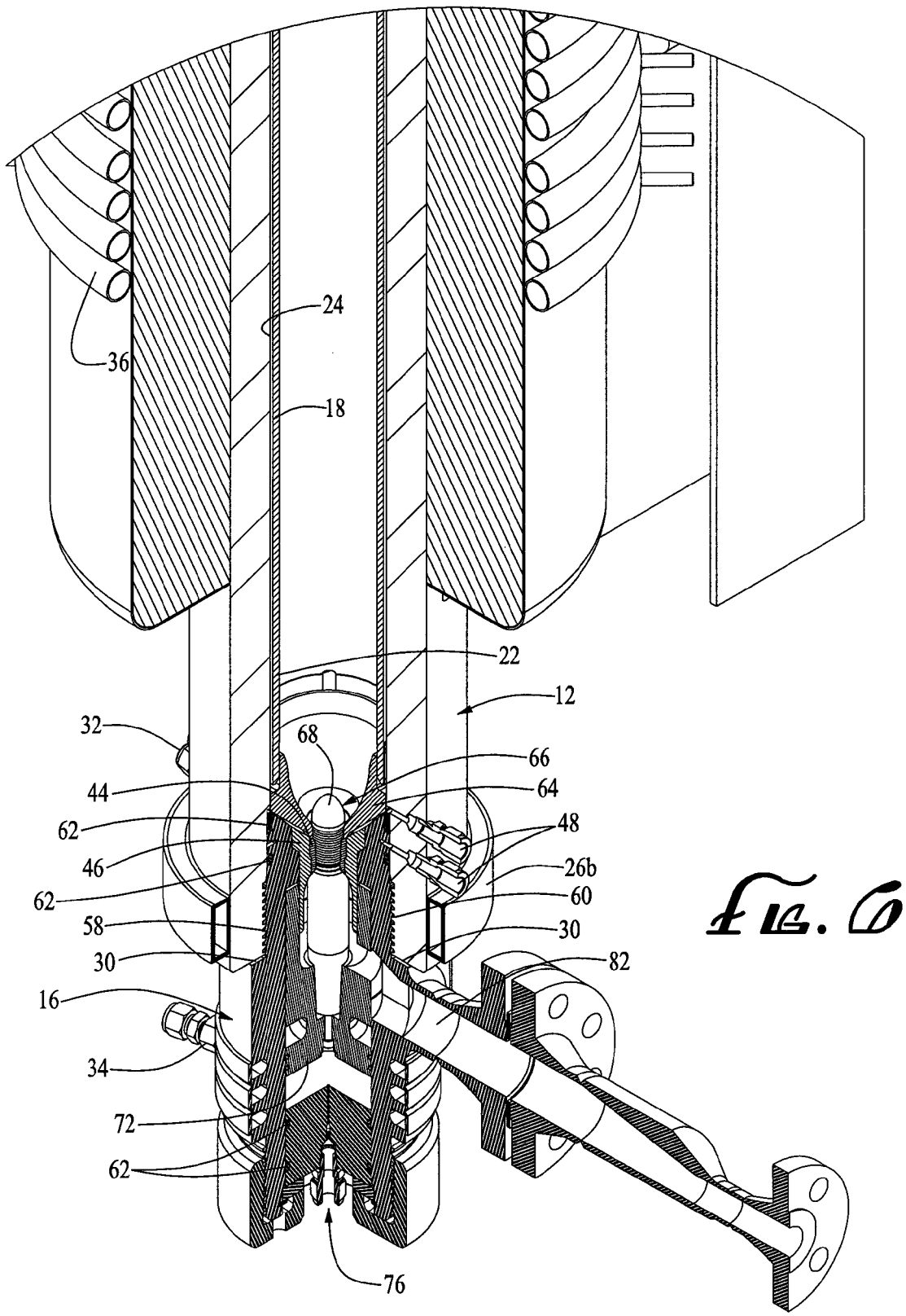
FIG. 6 is a detailed perspective drawing, in partial cutaway, of the lower portion of the reactor illustrated in FIG. 3.
Figure 7:
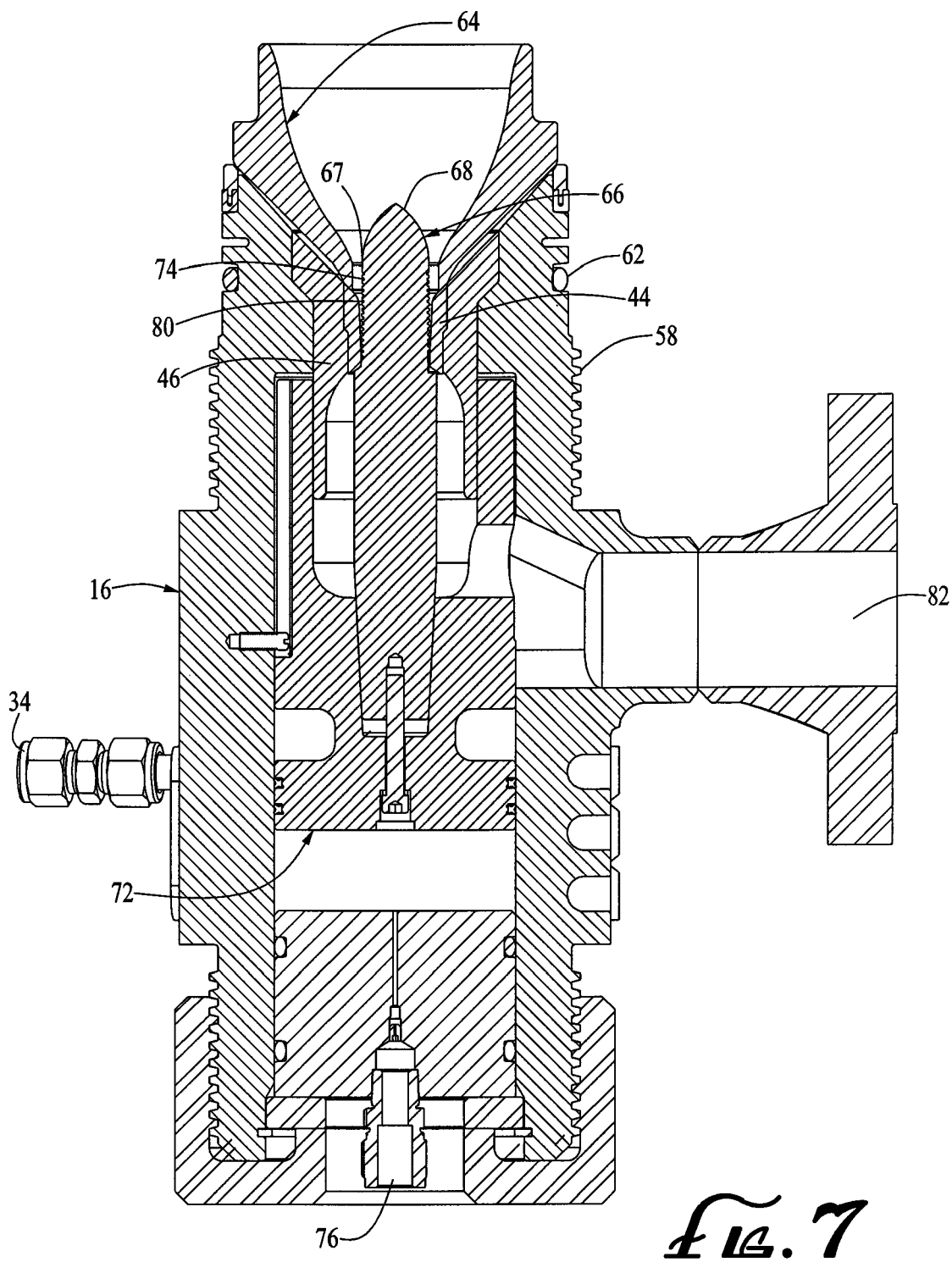
FIG. 7 is a cross-sectional side view of an integrated letdown valve and funnel used in the reactor illustrated in FIG. 3.

The valve housing 16 is illustrated in detail in FIGS. 6 and 7. The valve housing 16 is threaded with exterior threads 58 which are sized and dimensioned to cooperate with interior threads 60 disposed in the lower end 30 of the reactor body 12. Preferably, threads 58 and 60 are ACME threads. Seal rings 62 are disposed around the valve housing 16 to provide sealing between the valve housing 16 and the reactor body 12. As is the case with the seal rings 42 disposed around the upper plug 14, each seal ring 62 pair preferably has its own independent cooling system. Each independent cooling system is comprised of a circulation pump, a heat exchanger, a surge tank, and a control cylinder end cup and level alarms. Typically, however, the lowest seal ring 62 pair is not cooled.

Disposed within the valve housing 16 is a heat shield 64 and a letdown valve 66. The heat shield 64 is typically made from Hastelloy™ (UNS N 10276), high nickel alloys or various ceramic compositions. The heat shield 64 is dimensioned to collect solids from the oxidation zone 20 and to sweep the solids to a central aperture 67.

The letdown valve 66 comprises a valve seat insert 44, a ball cap 46, a pressure control needle 68 and a floating control valve piston 72. The valve seat insert 44 is positioned directly below the heat shield 64. The valve seat insert 44 provides a seating surface for the control needle 68.

The valve seat insert 44 fits tightly into the ball cap 46. The ball cap 46 maximizes the flow area for low pressure, high volume gases after they flow past the pressure control needle 68. The outer profiles of the ball cap 46 and the heat shield 64 are designed to slip into the valve housing 16 from the high pressure side and seat against a tapered seat in the valve housing 16.

The relationship between the pressure control needle 68 and the control valve piston 72 maintains the pressure control needle 68 centered and vertical.

The pressure control needle 68 is machined, typically from Hastelloy™ (UNS N 10276), high nickel alloys or various ceramic compositions. The underside of the ball cap 46 is contoured to match the dimensions of the pressure control needle 68. The bottom of the pressure control needle 68 fits into the top of the control valve piston 72 employing a machine taper similar to a Morse taper and is firmly bolted in place.

The pressure control needle 68 preferably has one or more small slots 74 machined into the seating surface to establish minimum flow through the valve when the pressure control needle 68 is fully seated in the valve seat insert 44. In the embodiment illustrated in the drawings, the one or more slots 74 is a single helical slot defining nearly horizontal grooves 80 in the exterior of the pressure control needle 68.

Gases and precipitated solid salts from the reaction chamber are routed into the letdown valve 66 by the heat shield 64. Salts which are formed by the combustion process within the oxidation zone 20 are carried with the superheated steam through the letdown valve 66. The salt and superheated steam are directed to a reactor exit port 82. The pressure control needle 68 serves as a movable throttling element in the letdown valve 64 to control pressure within the oxidation zone 20. As the reaction products flow past the pressure control needle 68, the reaction products are flashed to relatively low pressure superheated steam carrying the salts in suspension.

Pressure within the oxidation zone 20 is further controlled by pressurized control fluid provided through a control port 76 disposed at the base of the valve housing 16. The control valve piston 72 typically has between about ⅓ inch and about 1½ inch of axial float depending upon the size and shape of the pressure control needle 68. The axial float is set up by the dimensional allowances of the valve seat insert 44, ball cap 46, pressure control needle 68 and control valve piston 72. The control valve piston 72 position is controlled from outside the reactor 10 via the control port 76.

As salt deposits build up above the seating surface between the pressure control needle 68 and the valve seat insert 44, pressure slowly rises in the oxidation zone 20. This pressure rise causes a pressure feedback loop (described below) to call for greater letdown valve 66 opening, resulting in the salt deposits being swept into the exit port 82 through the letdown valve 66.

In one embodiment of the invention, one or more generally horizontal grooves 80 are machined around the upper exterior of the pressure control needle 68. Such groove or grooves 80 can be discreet or such groove or grooves 80 can be continuous, such as the grooves 80 defined by the helical slot 74 illustrated in the drawings. During operation, when the grooves 80 are exposed to the oxidation zone 20, salts tend to fill the grooves 80, thereby reducing the flow path past the pressure control needle 68 and causing a slow buildup of pressure within the oxidation zone 20. As the pressure builds within the oxidation zone 20, the pressure control needle 68 is slowly forced downwardly. When the pressure control needle 68 is depressed sufficiently to expose the grooves 80 to the low pressure conditions existing in an exit port 82, the salts are swept from the grooves 80 into the exit port 82. Once the salts are swept from the grooves 80, the available flow path past the pressure control needle 68 is increased, thereby reducing the pressure within the oxidation zone 20 and causing the pressure control needle 68 to slowly rise upwardly, whereupon the grooves 80 again are exposed to the high pressure conditions existing within the oxidation zone 20.

Figure 9:
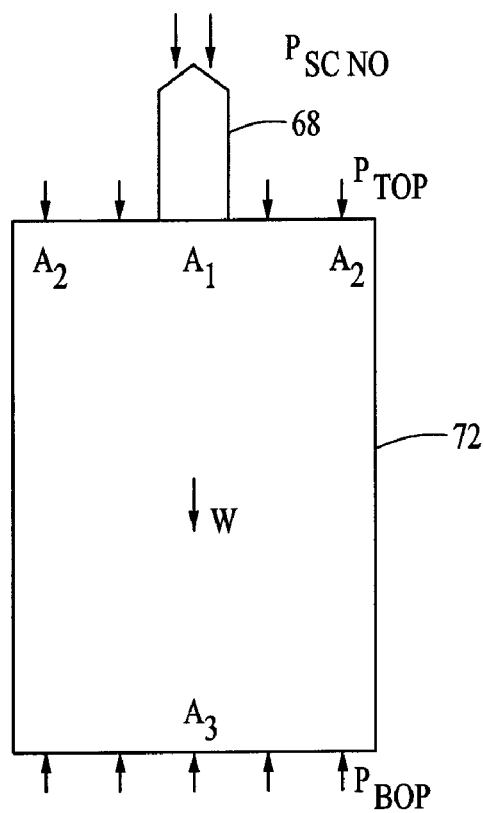
FIG. 9 is a diagram illustrating pressures exerted upon an internal letdown valve useful in the invention.

With reference to FIG. 9, the algorithm that controls the positioning of the control valve piston 72, and hence the pressure control needle, is as follows:

Control Piston in Vertical Equilibrium $$\Sigma fy \downarrow = \Sigma fy \uparrow$$

$P_{SCWO}$=Pressure exerted on needle by SCWO
$P_{TOP}$=Pressure exerted on the top of the piston
$P_{BOP}$=Pressure exerted on the bottom of the piston
$A_1$=Vertical area of the needle
$A_2$=Exposed area of the top of the piston
$A_3$=Area of the bottom of the piston
W=Weight of the piston $$P_{SCWO}A_1 + P_{TOP}A_2 + W = P_{BOP}A_3$$

$$P_{BOP} = P_{SCWO}\frac{A_1}{A_3} + P_{TOP}\frac{A_2}{A_3} + W\frac{1}{A_3}$$

$$A_1 = \frac{(1'')^2 \Pi}{4} \quad A_2 = \frac{(3.5''^2 - 1''^2)\Pi}{4} \quad A_3 = \frac{(3.5''^2)\Pi}{4}$$

$$P_{BOP} = P_{SCWO}\frac{1^2}{3.5^2} + P_{TOP}\frac{(3.5^2 - 1^2)}{3.5^2} + W\frac{4}{3.5^2 \Pi}$$

$$P_{BOP} = P_{SCWO}\frac{1}{12.25} + P_{TOP}\frac{11.25}{12.25} + 0.52 \text{ psig}$$

The 0.52 psig due to the weight of the piston is insignificant compared to the operating pressure of the SCWO, therefore:

$$P_{BOP} = P_{SCWO}\frac{1}{12.25} + P_{TOP}\frac{11.25}{12.25}$$

In a typical operation, the programmable logic controller code that results from applying this algorithm is described as follows:

Rung 100
   $A = P_{SETPOINT} - P_{SCWO}$
Rung 101
   If A>200
   A=200
Rung 102
   If A<200
   A=2A
Rung 103
   If A<−200
   Shutdown Oil Feed
Rung 104

$$P_{BOP} = \frac{P_{SCWO} + A + \text{Offset}}{12.25} + P_{TOP}\frac{11.25}{12.25}$$

Will work for all ranges of pressure control:
   During pressurization trying to get 200 psig+$P_{SCWO}$
   While $P_{SCWO}$>$P_{SETPOINT}$ provides feedback
   If $P_{SCWO}$>$P_{SETPOINT}$+200 psig–Shutdown oil feed Thus, back pressure control in the steady state operation of the invention is self-regulating. The process pressure acts on a small area on top of the control valve piston 72. The pressure control fluid, on the other hand, acts on a much larger area determined by the major diameter of the control valve piston 72. This control ratio allows the application of relatively low pressure control fluid (typically nitrogen or air) on the bottom of the control valve piston 72 to regulate the much higher process pressure on the top side of the control valve piston 72.

If the oxidation zone 20 pressure increases, the force on top of the control valve piston 72 increases and forces the pressure control needle 68 and the control valve piston 72 down, opening the gap between the pressure control needle 68 and the valve seat insert 44, increasing the flow area, and thus tending to decrease the pressure within the oxidation zone 20. Similarly, when the oxidation zone 20 pressure decreases, the control valve piston 72 and pressure control needle 68 are forced upwards, closing the gap and tending to increase the system pressure. If pressure within the oxidation zone 20 increases due to a buildup of solids bridging the flow area, the pressure control needle 68 is gradually pushed down, opening the gap and passing the blockage. The pressure control needle 68 will thereafter self-correct to the steady state position automatically upon passing any such bridging solids.

The oxidation zone 20 is controlled in terms of temperature and pressure to continuously remain above the critical point for water. In a typical operation, the temperature within the reactor 10 is between about 900 degrees F. and about 1100 degrees F., and the pressure within the reactor 10 is between about 3300 psig and about 3600 psig.

Reaction product gases and salts are removed from the valve housing 16 via the exit port 82. Typically, the reaction product gases are at a pressure of about 550 psig. The exhaust gases are typically slightly superheated to minimize the adhesion of salt slurry to downstream process piping. The reaction product gases and salts are thereafter routed through suitable gas/solids separation equipment (not shown), such as cyclone separators, electrostatic precipitators and/or bag houses and filters to remove the entrained salts.

In prior art SCWO reactors, the effluent must typically be diluted up to about 10:1 to transport the salts from the reactor 10 to a heat exchanger, then to a gas/liquid separator, then separated into respective effluent streams (gas and liquid) for additional processing. Salts are removed from the liquid effluent in a brine recovery system. Prior art methods of dealing with reaction products are contrasted with that of the method of the invention which incorporates an integral letdown valve 66 to transport the salts out of the lower area of the reactor 10 as a solid suspension in the exhaust gases.

In a typical operation of the invention, superheated steam carrying solid salts at around 550 psig and 900° F. is removed from the reactor 10 and sent to a cyclone separator. In one embodiment, the combined steam/salt flow rate is typically around 420 lb/hr. Solid salts are separated by centrifugal force and fall to the bottom of the cyclone separator. Superheated steam exits the top of the cyclone separator. The steam is let down to atmospheric pressure through use of a back pressure control valve. The steam is then mixed with ambient air and send through an activated carbon filter to ensure compliance with applicable emissions standards.

The solid salts and condensate which accumulate at the bottom of the cyclone separator can be handled by allowing the solid salts and condensate to fall into a pair of high durability valves in series that operate as an airlock to allow ejection of salt while minimizing the flow of steam. Initially, both valves are closed. When the top valve is opened, salts from the cyclone separator begin to fill the pipe between the two valves. When the space between the two valves is approximately half full, the upper valve is closed. Next, the lower valve is opened. When the lower valve opens, the expansion of the superheated steam between the two valves provides the motive force to move the salt into the downstream piping where it rejoins the steam and condensate at the exit of the backpressure regulator.

The process stream can then be directed to a moisture separator that separates the condensate and brine from the vapor. The vapor is typically directed to an exhaust ventilation stack through a HEPA filter that incorporates a carbon filter. The brine that collects in the moisture separator is pumped to a suitable holding tank pending disposal.

This integral salt-processing design simplifies the SCWO system of the invention and eliminates problems with salt precipitate fowling the backpressure regulator.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A reactor useful in the continuous oxidation of organic material in a supercritical water oxidation process, the reactor comprising:
   (a) a reactor body with reactor walls;
   (b) and a threaded reactor upper plug; and
   (c) a cylindrical liner attached solely to the threaded reactor upper plug, such that, when the threaded reactor upper plug is removed from the reactor, the reactor liner is consequently and simultaneously removed from the reactor as well.

2. The reactor of claim 1 wherein the reactor liner is attached to the threaded reactor upper plug by pins.

3. The reactor of claim 1 wherein an annulus is defined between the reactor walls and the reactor liner and wherein means are provided for continuously purging the annulus during operation.

4. The reactor of claim 1 further comprising one or more seal rings to seal the threaded reactor upper plug to the reactor body and means for separately cooling the one or more seal ring seals.

5. A reactor useful in the continuous oxidation of organic material in a supercritical water oxidation process, wherein the reactor comprises a pressure letdown valve located internal to the reactor.

6. The reactor of claim 5 wherein the letdown valve comprises a control valve piston and a pressure control needle disposed at the outlet of a ball cap.

7. A reactor useful in the continuous oxidation of organic material in a supercritical water oxidation process, the reactor comprising:
   (a) a reactor body with reactor walls for oxidizing organic material to post-oxidation material; and
   (b) a pressure letdown valve located internal to the reactor capable of reducing the pressure within the reactor of the post-oxidation material.

8. The reactor of claim 7 wherein the letdown valve is capable of reducing the pressure within the reactor of the post-oxidation material to less than about 550 psig.

9. The reactor of claim 7 wherein the internal letdown valve comprises a control valve piston and a pressure control needle disposed at the outlet of a ball cap.

10. A reactor useful in the continuous oxidation of organic material in a supercritical water oxidation process, the reactor comprising:
    (a) a reactor body with reactor walls for oxidizing organic material to post-oxidation material; and
    (b) an internal letdown valve capable of reducing the pressure within the reactor of the post-oxidation material;
    wherein the letdown valve is capable of reducing the pressure within the reactor of the post-oxidation material to less than about 550 psig; and
    wherein the internal letdown valve is capable of maintaining condensible material within the post-oxidation material in gaseous form and transporting solid salts within the post-oxidation material in a gaseous suspension.

11. A reactor useful in the continuous oxidation of organic material in a supercritical water oxidation process, the reactor comprising:
    (a) a reactor body with reactor walls for oxidizing organic material to post-oxidation material; and
    (b) an internal letdown valve capable of reducing the pressure within the reactor of the post-oxidation material;
    wherein the internal letdown valve comprises a control valve piston and a pressure control needle disposed at the outlet of a ball cap; and
    wherein the pressure control needle has slots for allowing minimum flow when the pressure control needle is fully seated in a ball cap seating surface.

* * * * *